Nov. 9, 1943.  H. T. FAUS  2,333,991
ELECTRICAL MEASURING INSTRUMENT
Filed Sept. 19, 1939   2 Sheets-Sheet 1
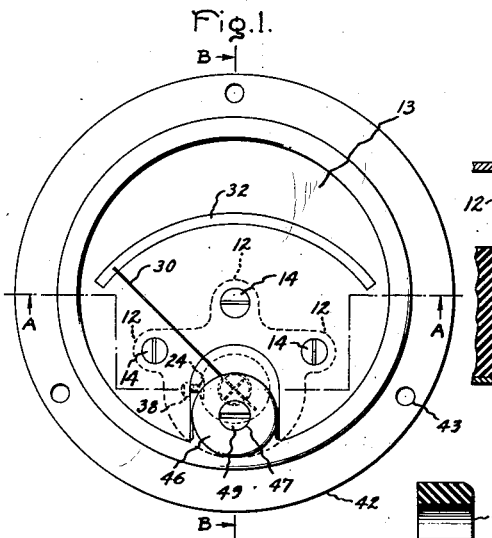
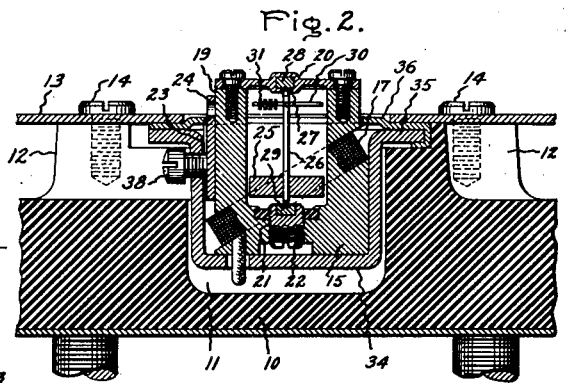
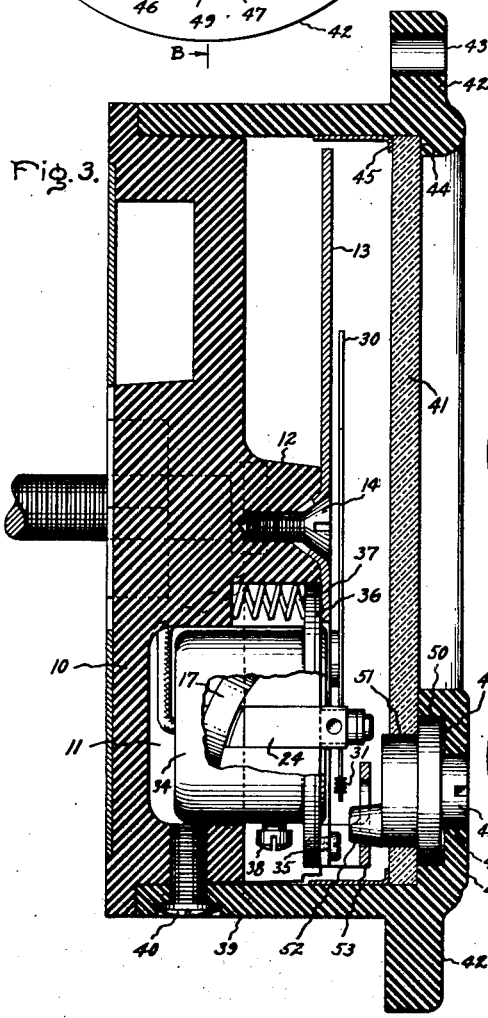
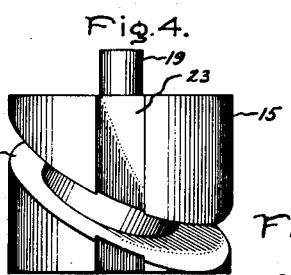
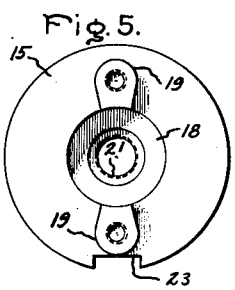
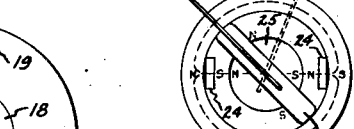
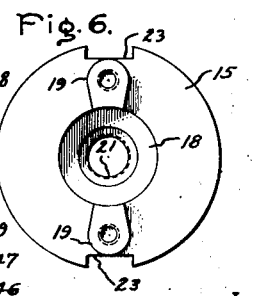
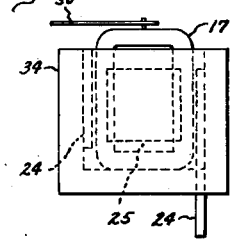
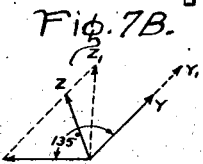
Inventor:
Harold T. Faus
by Harry E. Dunham
His Attorney.

Nov. 9, 1943.  H. T. FAUS  2,333,991
ELECTRICAL MEASURING INSTRUMENT
Filed Sept. 19, 1939  2 Sheets-Sheet 2
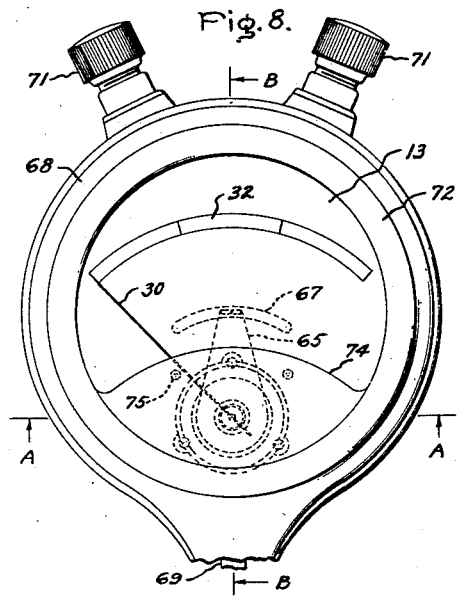
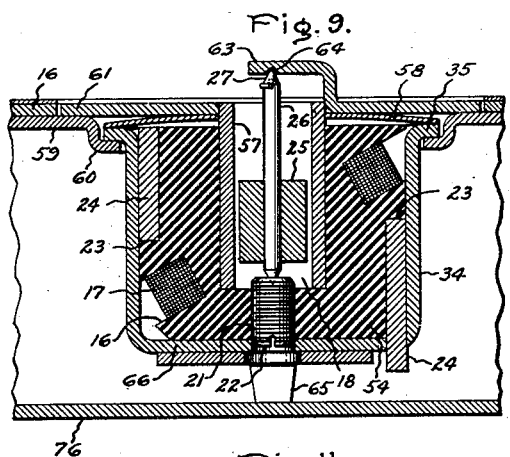
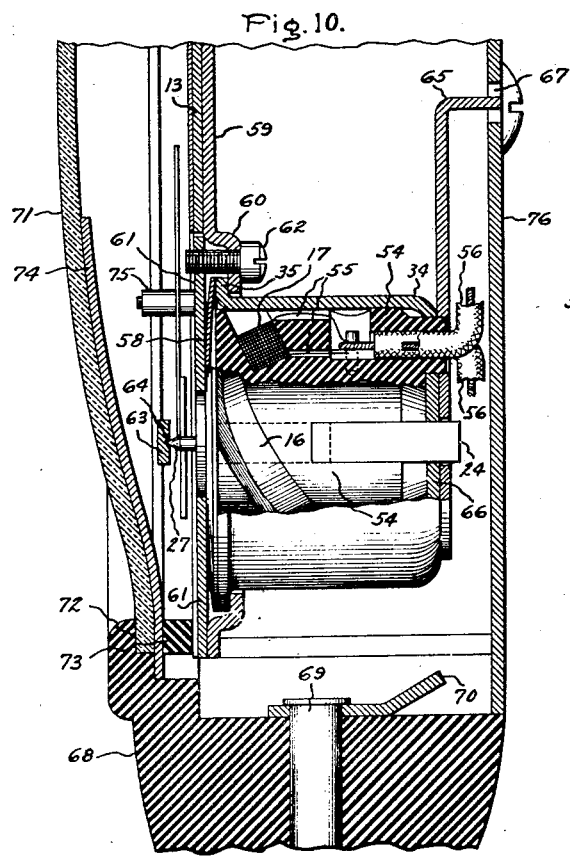
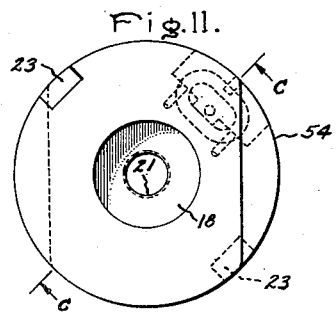
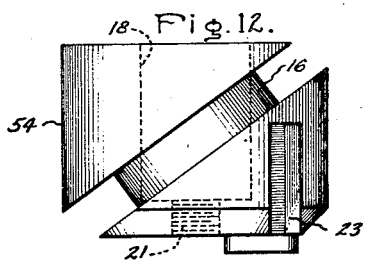
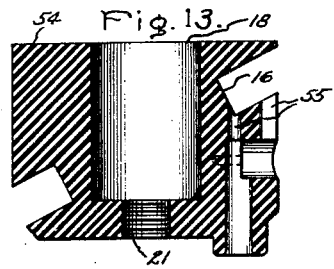
Inventor:
Harold T. Faus,
by Harry E. Dunham
His Attorney.

Patented Nov. 9, 1943

2,333,991

UNITED STATES PATENT OFFICE 2,333,991

ELECTRICAL MEASURING INSTRUMENT

Harold T. Faus, Lynn, Mass., assignor to General Electric Company, a corporation of New York Application September 19, 1939, Serial No. 295,597

7 Claims. (Cl. 171—95)

This invention relates to electrical measuring instruments and concerns particularly electrical measuring instruments of the moving magnet type for measuring unidirectional currents and voltages.

In my prior Patent 2,102,409 there is disclosed an electrical measuring instrument employing a movable armature consisting of a light weight permanent magnet. This magnet is partially surrounded by a stationary damping shell of conducting material and by a stationary coil which carries the current to be measured. The instrument is shielded from stray fluxes by placing it in an inclosure of magnetic material. A magnetic zero adjuster comprising a second permanent magnet cooperates with the shield and is positioned in vertical axial alignment with the movable member. In the instrument disclosed in the aforesaid patent, the zero adjustment is made by turning the control magnet relative to the fixed scale, without altering the position of the current coil. With this method a change in the relative angular displacement between the control field and the field produced by the coil causes a change in the scale distribution of the instrument, which means that the instrument cannot be used with a predetermined scale. Furthermore, with the former construction, if it becomes necessary to remove the moving magnet element from the damping shell for any reason, such as, for example, to clean the pivots or to remove accumulations of magnetic particles from the air gap, it is necessary to first remove the current coil. In addition to the inconvenience caused by removing the current coil each time the movable element is removed, great care is required to remove and replace the movable element without changing the calibration of the instrument.

It is an object of my invention to provide an improved electrical measuring instrument of the moving magnet type with a simple arrangement for adjusting the direction and magnitude of the restoring force for the movable element.

It is another object of my invention to provide an improved measuring instrument of the aforesaid type in which the zero adjustment may be made without affecting the calibration of the instrument.

It is a more specific object of my invention to provide an improved electrical measuring instrument employing a permanent magnet rotor in which the angular position of the adjustable control magnet and the current coil is fixed with respect to the shaft as an axis.

It is a further object of my invention to provide such an instrument wherein the moving magnet may be readily removed and replaced without removing the current coil and without disturbing the calibration of the instrument.

It is a still further object of my invention to provide an improved instrument of the above character which shall be of a simple, compact, and rugged construction, which nevertheless compares favorably in accuracy with the usual d'Arsonval type of instrument, and which may be manufactured for low cost.

In carrying my invention into effect in its preferred form I employ an inclined coil which is wound at an angle in a recess about a coil form which partially surrounds the movable permanent magnet element of the instrument. The control magnet is also placed in a longitudinal recess or recesses in the spool or coil form arranged parallel to and in axial displacement with the axis of rotation. In one instance the coil form is made from a die-cast member of electrically conducting non-magnetic material which serves as a damping element for the movable member of the instrument. The lower bearing for the movable element is supported by the coil form, and a bridge member secured to the coil form and provided with a suitable bearing, properly positions the upper end of the rotary shaft. A magnetic shell surrounding the elements of the instrument provides the necessary shielding from stray magnetic fluxes and serves as a return path for the fluxes of the instrument. The zero adjustment is obtained by turning the entire assembly of current coil, control magnet, and shield, and the necessary restoring force or full scale adjustment is obtained by moving the control magnet relative to the movable permanent magnet element in a direction parallel to the shaft.

In a modified form of construction the coil form is made of a molded composition to improve the insulating characteristics of the instrument. In this case a shell of conducting material is placed inside the coil form to provide the necessary damping for the instrument and to provide a support for the lower bearing. A bridge member, which, for convenience, may be formed integrally with a top plate provides the necessary upper bearing surface.

The novel features which are characteristic of my invention are set forth with particularity in the appended claims. For a better understanding of my invention, reference is made in the following description to the accompanying drawings in which Fig. 1 is a plan view of one form of the improved instrument embodying my invention; Fig. 2 is a vertical sectional view taken along the line A—A of Fig. 1; Fig. 3 is a partial vertical sectional view taken along the line B—B of Fig. 1 with certain parts broken away to show the interior construction; Fig. 4 is a side elevational view of the coil form and damping element; Fig. 5 is a plan view of the coil form of Fig. 4; Fig. 6 is a plan view of a modification of the coil form disclosed in Fig. 5; Figs. 7 and 7a represents schematic diagrams which will be employed for explaining the principle of operation of the apparatus of my invention; Fig. 7b is a vector diagram explanatory of the deflection forces in my instrument; Fig. 8 is a plan view of a modified form of instrument; Fig. 9 is a vertical sectional view taken along the line A—A of Fig. 8; Fig. 10 is a partial vertical sectional view taken along the line B—B of Fig. 8; Fig. 11 is a plan view of the coil supporting elements; Fig. 12 is an elevational view of the coil supporting element of Fig. 11; and Fig. 13 is a vertical sectional view taken along the line C—C of Fig. 11.

Referring to the drawings the numeral 10 represents the base of the instrument casing which may be conveniently formed from any suitable material such as a phenolic condensation product. The base 10 is provided with a suitable recess 11 within which are positioned the elements of the measuring device and in addition is provided with a plurality of integral bosses 12. A scale plate 13 formed preferably of a nonmagnetic material such, for example, as brass is securely held in position on the bosses 12 by means of a plurality of screws 14. The scale plate 13 also provides means for holding the measuring element firmly in position in the base 10 as will be later described.

I provide means whereby the moving magnet element may be removed and replaced independently of the coil element thereby facilitating ease of removal and reassembly of the parts and at the same time obviating any tendency toward interference with the calibration on the instrument. In accordance with the embodiment illustrated, this includes the use of an electrically conducting spool or coil support 15 of generally cylindrical shape which may be formed conveniently by a die-casting process of some suitable material such, for example, as aluminum. The form 15 is provided with an inclined recess or groove 16 in its external surface which is adapted to receive the coil element 17 and it has an internal recessed portion 18. The coil form 15 is also provided with a plurality of posts or standards 19 which serve to support a bridging piece or bracket 20, the function of which will be presently described. In addition, the coil form 15 is provided with screw threads 21 in its bottom portion to receive a plug 22 for supporting the lower bearing of the movable element. The coil form is also provided with a longitudinal recess or groove 23 which provides a suitable means for positioning a control magnet 24.

The magnetic rotor 25 which serves as the moving armature of the instrument consists preferably of an unlaminated cylinder of magnetic material which is capable of being permanently magnetized and which is transversely polarized across the diameter thereof.

The rotor 25, for the sake of maximum torque with minimum weight, is composed of a high coercive force material. It may be composed of material such as cobalt steel or an aluminum, nickel, iron alloy composed of nearly 16% aluminum and approximately 20% nickel, and, if desired, also a small percentage of cobalt, for example. However, for the sake of obtaining increased lightness, reduction in inertia, and for obtaining maximum efficiency of utilization of magnet material, I prefer to employ material known as sintered oxide which may be prepared in accordance with the instructions given in my prior patent already referred to. This material in addition to having a coercive force between 700 and 1000 oersteds has a very definite line of polarization which does not shift, and because of this high coercive force, the magnet may be made very short in length along its polarized axis thereby reducing to a minimum the space required for the movable element of the instrument. The use of this material is also highly advantageous in that it is very light in weight as compared to other magnetic materials, its specific gravity being approximately one-half that of ordinary steel.

Another material which I have employed in the construction of the rotor element with highly satisfactory results is an alloy composed of copper, nickel, and cobalt, such as described in the "Zeitschrift fur Metallkunde" of July, 1938. A suitable composition I have found to be 60% of copper, 20% of nickel, and 20% of cobalt.

As indicated in the drawings, the control magnet 24 is made very thin with a large area of cross section, and is polarized across this minimum dimension. The result is a very short permanent magnet. My invention is, of course, not restricted to the use of any particular material for the control magnet 24, which controls both the zero adjustment and the full scale adjustment or restoring force, but I have found that an alloy composed of silver, aluminum, and manganese, is satisfactory for this purpose. Such an alloy has been produced having a coercive force of approximately 6000 oersteds, which high coercive force allows the material to be magnetized across its least dimension and located close to the magnetized rotor element 25 without danger of having its initial magnetization affected by the magnetic field of the moving element. A suitable composition for the control magnet I have found to be approximately 87% of silver, approximately 4.3% aluminum, and 8.7% of manganese. However, a wide variation in percentages is permissible.

The permanent magnet 25 is mounted on a non-magnetic shaft or pivot staff 26 which passes through its central axis and is positioned in the recess 18. The ends of the shaft 26 form polished steel pivots or the like 27 which turn in the upper and lower bearings 28 and 29, respectively. As indicated, the upper bearing 28 is supported by the bridging piece 20 and the lower bearing 29 is supported by the plug 22 which engages the bottom portion of the coil form 15. A pointer 30, provided with suitable counterweight means 31, is carried by the shaft 26 and cooperates with a scale 32 positioned on the scale plate 13. The coil form 15, since it is formed of a non-magnetic material, and one which is preferably of high electrical conductivity, such as aluminum, serves to dampen the oscillations of the movable element 25 to bring it to rest rapidly when it changes its rotary position in response to a sudden change of current in the stationary current coil 17. When the rotor moves eddy currents set up in the aluminum cylinder 15 produce magnetic fluxes which oppose the rotor movements and allow the instrument pointer to indicate the reading without undue swinging. In addition, the coil form 15 provides a support for the rotary shaft 26 and for the adjustable control magnet 24. The coil 17, being positioned in the inclined recess or groove 16 formed in the external surface of the damping element or spool 15, does not interfere with the removal and replacement of the movable element 25. In other words, the armature 25 may be moved axially with respect to the damping element independently of the coil.

The generally cup-shaped member 34, which is preferably composed of a high permeability, low hysteresis, magnetic material such as Mu metal, for example, serves to magnetically shield the instrument from external magnetic fields and also serves as a partial return path for the flux of the permanent magnet armature 25 and the control magnet 24 and for the flux produced by the stationary current coil 17. The magnetic shield 34 is provided with a flange 35 on which rests a magnetic disk or washer 36 which completes the magnetic shielding. The whole assembly is thus enclosed in a complete metal box.

I provide means for securing the instrument assembly to the base 10 of the casing. In the arrangement illustrated this comprises a plurality of helical springs 37, for example three, spaced equidistantly about the periphery of the flange 35 and engaging the underneath portion thereof. The scale plate 13 which is secured to the bosses 12 of the base 10 by means of the screws 14 already described, frictionally engages the upper annular surface of the magnetic disk member 36 thereby exerting a force on the springs 37 to hold the instrument assembly firmly in position. This provides a simple means for mounting the instrument in the casing.

The magnitude of the restoring force produced by the control magnet 24 may be altered by varying the amount of control flux threading the rotor 25. Therefore, by moving the control magnet 24 up or down to the desired position in the longitudinal recess 23, the amount of flux which passes through the rotor 25 may be readily controlled. The stud or screw 38 which engages the magnetic shell 34 provides means for maintaining the control magnet 24 in any adjusted position.

I provide means for controlling the direction of the restoring force to adjust the zero setting of the instrument. In accordance with the arrangement illustrated the instrument is provided with a cylindrical portion 39 forming part of the casing and the base portion 10 which closes the bottom end of the cylinder. These two parts are secured together by any suitable means such as a plurality of screws 40. The opposite end of the cylinder is closed by a cover glass 41. The cylinder is provided with a flange 42 having holes 43 for mounting the instrument against any suitable board or plate. The inside surface of the cylinder extends over the edge of the glass plate 41 at 44 to secure it from outward movement, the annular abutting surface 45 serving to hold the glass plate against the extended portion 44. The cylinder 39 is also provided with an overhanging portion 46 having a central opening 47 and an annular recess 48 therein, within which is positioned the adjusting member 49 and the annular portion 50 of the zero adjusting element, respectively. The window 41 is provided with an opening which is adapted to receive the reduced diameter portion 51 of the zero adjusting element 49 and also serves as a support for the enlarged diameter portion 50. The adjusting element is also provided with an eccentric member 52 which engages a slotted element 53 fixed to the magnetic disk 36 and the flange 35 of the magnetic shield 34. Thus, to change the zero setting of the instrument, I vary the direction of the restoring force merely by turning the adjusting member 49 which in turn rotates the entire assembly of magnetic shield 34, coil 17 and control magnet 24 relative to the fixed scale 32. It will thus be seen that the position of these elements relative to each other remains unaltered in making the zero adjustment and therefore the calibration of the instrument does not change.

In Fig. 6, I have disclosed a modified construction of the coil supporting element which enables the employment of a plurality of control magnets, if so desired. This is made possible by the provision of a plurality of diametrically opposed longitudinal slots 23 which are adapted to receive the control magnets 24. In this way the magnitude of the restoring force may be increased thereby making the instrument adaptable for use over a wide range of measurement by changing the amount of current required for full scale deflection.

A better understanding of the principle of operation of my invention may be obtained by referring to the schematic diagrams of Fig. 7. In Fig. 7 and Fig. 7a I have illustrated the metal cup or shield 34 of magnetic material, with two small permanent magnets 24 mounted in diametrically opposed relation and polarized transversely across the narrow width as shown. It is obvious that magnetic flux will flow through the metal cup and across the gap as indicated by the dotted lines. This magnetizing force is represented by the vector X as illustrated in Fig. 7b.

If now the cylindrical rotor 25, magnetized diametrically and free to rotate about its longitudinal axis, is placed between the magnets, it will assume the position wherein the poles N and S on the rotor are in alignment with and adjacent the South and North poles respectively of the control magnets 24, in much the same manner as a magnetic compass aligns itself with the earth's field and points north. The pointer 30 indicates the rotor position and in Fig. 7 is shown in the zero position.

To simplify the explanation, the current carrying coil 17 is shown mounted parallel to the axis of the rotor, rather than in the inclined position employed in my invention. Assume that the coil 17 is arranged with its sides displaced 45° from the control magnets 24. When a current is sent through the coil, it produces a magnetic flux which is displaced 135° from the control magnet flux. The vector Y indicates the direction of this magnetizing force and, also, its magnitude for a given current. The vectors X and Y added together give the resultant flux produced by the current coil 17 and the control magnets 24, and the polarized rotor 25 will assume a position parallel to the resultant vector Z as indicated.

The vector Y varies in magnitude, depending upon the amount of current flowing in the coil, as indicated by the letters Y, $Y_1$, etc. This variation in magnitude of vector Y produces changes in direction, as well as slight changes in magnitude, of vector Z, as indicated, for example, by $Z_1$. Changes in the direction of vector Z obviously cause the rotor 25 to assume different positions; the slight changes in magnitude, however, do not affect the rotor position, any more than a weakening of the earth's field would affect the position of a magnetic compass. This arrangement provides an almost linear scale distribution. It is obvious that if changes in magnitude of the vector Y produce direction changes in the vector Z, like changes in magnitude of the vector X will also produce the same effect. This fact is used in the calibration or adjustment of the instrument to a predetermined full scale current, simply by sliding one of the control magnets 24 in or out of the metal shield or cup 34. This changes the magnitude of the control magnet flux threading the rotor as represented by the magnitude of vector X. Also, the zero adjustment is made simply by turning the whole assembly of shield 34, coil 17, and control magnets 24 relative to the scale 32 by means of the zero adjusting device 49. In view of the foregoing it is obvious that the rotor 25 carrying the pointer 30, will automatically assume a new position in accordance with that of the control magnets.

The modified form of the instrument disclosed in Figs. 8 to 13, inclusive, is quite similar to that just described in connection with Figs. 1 to 6 but differs principally in that the coil 17 is wound about a coil form 54 which is constructed of a molded material such as a phenolic condensation product having electrical insulating properties. As clearly indicated in the various views, particularly Figs. 11 to 13, the coil supporting element is provided with the inclined external annular recess 16 for supporting the stationary coil 17 and with the slots or grooves 23 for receiving the control magnets 24. It is also provided with an annular internal recess 18 for receiving the movable element 25, and a threaded opening 21 in its bottom portion for receiving the bearing screw 22. A plurality of vertical bores 55 are provided for connecting the leads 56 of the coil with the instrument terminals.

The use of such a construction necessitates the employment of additional means for damping the oscillations of the instrument. With this arrangement I therefore provide a cylindrical member 57 of copper or aluminum, or other suitable non-magnetic, electrically conducting-material, which is positioned inside of the coil form 54. As in the former case, the coil form 54 is mounted within the magnetic shield 34 and the flexible magnetic metal washer 58. The magnetic shield which is provided with the usual flanged portion 35 is supported by means of the element plate 59 which has an opening therein provided with an offset flanged portion 60. The element is clamped securely in position by means of the cover plate 61 constructed of a non-magnetic material such as brass, for example, which bears against the flexible magnetic washer 58. A plurality of screws 62 engage the flange 60 and the cover plate 61 to frictionally maintain the instrument in position. The scale plate 13 is in this case secured to the element plate 59. The cover plate 61 is provided with a bridge member 63, having an indentation 64 therein which serves as the upper bearing surface for the shaft 26 of the movable element 25. The bearing friction may be adjusted by means of the bearing screw 22 which engages the lower end portion of the coil form 54 and which in addition serves as the lower bearing member. While I have shown simple indentations in the brass top bridge 63 and the bearing screw 22 for the bearing surfaces, these bearings may be the conventional sapphire jewels, if desired.

The control magnets 24 are positioned diametrically opposite in suitable recesses 23 provided in the insulated coil form 54. To vary the magnitude of the restoring force it is necessary to move only one of the control magnets in or out of its slot 23 since this changes the magnitude of the control magnetic flux linking the rotor 25, as already described.

In order to obtain the desired zero adjustment I provide a zero adjusting arm 65 which is securely fixed to the bottom portion 66 of the magnetic shield 34 and which, upon being rotated by turning arms 65 through the slot 67, moves the assembly including the magnetic shield 34, the stationary coil 17 and the control magnets 24 as a unit to vary the position of the pointer 30 with respect to the scale 32.

In the construction illustrated I have shown the instrument mounted in a casing 68 preferably of molded material but of a different construction from that shown in Figs. 1 to 3 in order to indicate how the instrument may be employed, for example, in the testing of storage batteries. For such use, I provide a prong 69 with a connection clip 70 which may serve as one of the terminals of the instrument and which may be connected to one of the binding posts 71 interiorly of the instrument thereby adapting the instrument to universal application. The other binding post may be connected if desired through a flexible cord to another prong similar to 69, and with this construction the voltage may be measured between any two conductors having a wide variation in spacing. A glass window 41a is in this case held firmly in position against the annular rim 72 of the instrument case 68 by means of an annular resilient gasket member 73 positioned intermediate the scale plate 13 and the window 41a. I also provide a front shield element 74 which may be constructed of a light material and which serves to shield the instrument assembly from view of the observer so that only the pointer 30 and the scale section 32 may be seen. I may also provide a plurality of studs or projecting members 75 secured to the cover plate 61 for limiting the range of movement of the pointer 30. The instrument assembly is enclosed in the case 68 by means of a back plate 76.

My improved form of electrical measuring instrument eliminates the necessity of a number of delicate parts commonly associated with instruments of the d'Arsonval type of construction and because of its simplicity and rugged construction it can stand considerable abuse. It is also compact and the parts are readily accessible. While the polarized vane type of instrument may be as rugged as the present construction it does not have the accuracy required by many applications. I have thus made a distinct advance in the art by providing an instrument in which it is not necessary for the user to compromise with his accuracy and ruggedness requirements.

In accordance with the provisions of the patent statutes, I have described the principle of operation of my invention together with the apparatus which I now consider to represesnt the best embodiment thereof but I desire to have it understood that the apparatus shown is only illustrative and that the invention may be carried out by other means. Although I have referred to the coil 17 as a "current" coil, I intend that this terminology shall apply in a broad sense, since it will be understood that the instrument is also adapted to the measurement of voltage.

What I claim as new and desire to secure by Letters Patent of the United States, is:

1. In an electrical measuring instrument comprising a movable armature consisting of a permament magnet polarized in a direction perpendicular to its axis of rotation, a generally cup-shaped current conductive electrical damping element, a groove in its external surface, means including said damping element for mounting said armature for rotation within said damping element, said damping element having portions removed from its external side walls to form a groove therein, a stationary coil surrounding said armature, said coil being mounted in said groove in fixed relation with said damping element and out of the path of axial movement of said armature, whereby said armature may be inserted in or removed from said damping element independly of said coil, said damping element having a longitudinal groove formed in the side wall thereof substantially parallel to said axis of rotation, and a permanent magnet positioned in said groove, said magnet being polarized in a direction transverse to the axis of rotation to produce a restoring force on said armature.

2. A direct current measuring instrument comprising an armature consisting of a permanent magnet mounted for rotation about an axis perpendicular to its line of polarization, a substantially cylindrical member of conducting material having a closed end portion, said cylindrical member being substantially coaxial with said armature and supporting a bearing for said armature in the closed end portion, a stationary coil for producing a measurement flux across the axis of rotation of said armature, a cup-shaped magnetic shield for said instrument partially enclosing the armature and the cylindrical member coaxial therewith, said member having a longitudinal recess parallel to and axially displaced from the axis of rotation of the armature, and a control permanent magnet producing a restoring force on the armature, said control magnet being axially movable in said recess for varying the magnitude of said force, and rotatable about the axis of rotation of the armature and relative to the scale of the instrument for changing the direction of said force.

3. In a direct current measuring instrument, the combination with a substantially cup-shaped member of conducting material, of a bridging member across said cup-shaped member, a movable element mounted for rotation between said bridge and the bottom of said cup-shaped member, said movable element comprising a pivot staff and a permanent magnet mounted on said staff and polarized in a direction normal to its axis of rotation, a longitudinal recess in said cup-shaped member displaced from and parallel to said axis of rotation, a second permanent magnet mounted in said recess and polarized in a direction normal to the axis of rotation of the movable element, a stationary current coil surrounding said armature and mounted on said cup-shaped member, a magnetic shell surrounding said cup-shaped member and secured thereto, and means to rotate said control magnet and stationary coil relative to the instrument scale, to adjust the zero position of the movable element.

4. A direct current measuring instrument having a movable armature consisting of a permanent magnet polarized in a direction perpendicular to its axis of rotation, a cup-shaped conducting member provided with a longitudinal recess parallel to and displaced from the rotary axis of said armature, means for mounting said armature for rotation within said conducting member, a second permanent magnet positioned in said recess, said magnet being polarized in a direction perpendicular to said axis of rotation, a magnetic shield for said instrument enclosing the cup of conducting material coaxial therewith for protecting the instrument from stray fluxes and serving as a magnetic return for fluxes of the instrument, means for adjusting the axial position of said second permanent magnet in said recess for varying the restoring torque on said armature, and means for rotating said magnet to vary the zero setting of said armature.

5. A direct current measuring instrument having a movable armature consisting of a magnetic cylinder of high coercive force material and polarized across a diameter thereof normal to its axis of rotation, a damping element, means for rotatably mounting said armature within said damping element, a stationary current coil surrounding said armature for producing a measurement flux across the axis of rotation of said armature, means for mounting said coil about said damping element in fixed relation therewith and out of the path of axial movement of said armature through said damping element, a substantially cup-shaped magnetic member positioned around said damping element and secured in fixed relation thereto, a permanent magnet axially displaced from said movable element and polarized to produce a control flux across the axis of rotation of said armature, means for moving said magnet in a direction parallel to the axis of rotation to provide a return torque of adjustable magnitude on said armature, and means for rotating said permanent magnet and said damping element to adjust the zero position of said armature.

6. In an electrical measuring instrument comprising a movable armature consisting of a permanent magnet polarized in a direction perpendicular to its axis of rotation, a member of conducting material partially enclosing said armature and serving to damp the oscillations thereof, a first groove formed in the surface of said member and surrounding said armature, a longitudinal groove formed in said member in axial displacement from and parallel to the axis of rotation of said armature, a stationary coil supported by said cylinder and positioned in said first groove for producing a flux in said armature and at an angle to the axis of rotation thereof, a thin control permanent magnet positioned in said longitudinal groove and polarized across its least dimension to produce a restoring force on said armature, a magnetic shield surrounding said armature and coil for protecting the same from external stray fluxes and serving as a return path for the fluxes of said two permanent magnets, means for adjusting the axial position of said control magnet in said groove to vary the amount of control flux linking the armature, and means for rotating said control magnet and coil relative to the instrument scale about the axis of rotation of the armature.

7. An electrical instrument of the direct current type comprising a cylindrical permanent magnet armature polarized across its diameter and mounted for rotation on its axis, a member of conducting material having a cylindrical opening in which said armature is concentrically mounted, said member serving as a damping member with respect to said armature, said damping member having an outer recessed wall portion, a winding supported substantially within the recessed portion of said damping member for producing a flux through said armature at an angle to its axis of rotation, permanent magnet control means for producing an adjustable zero restoring torque flux on said armature, and a cup-shaped member of magnetic material within which all of the previously mentioned parts are contained, serving as an external magnetic shield for the instruments and as a partial return path for the instrument fluxes, said armature being axially removable from the damping member and said damping member being axially removable from said magnetic cup, both with the winding remaining supported immovably in place in fixed relation in the recessed portion of the damping member.

HAROLD T. FAUS.